US009500192B2

(12) United States Patent
Inui et al.

(10) Patent No.: US 9,500,192 B2
(45) Date of Patent: Nov. 22, 2016

(54) COMPRESSED AIR SUPPLY APPARATUS

(71) Applicants: MITSUBISHI HEAVY INDUSTRIES, LTD., Tokyo (JP); Mitsubishi Electric Corporation, Tokyo (JP); CENTRAL JAPAN RAILWAY COMPANY, Aichi-ken (JP)

(72) Inventors: Takahisa Inui, Tokyo (JP); Tomoki Watanabe, Tokyo (JP); Gakuji Kobayashi, Aichi-ken (JP); Noriyuki Taniyama, Aichi-ken (JP); Shinichiro Tanaka, Aichi-ken (JP)

(73) Assignees: MITSUBISHI HEAVY INDUSTRIES, LTD., Tokyo (JP); MITSUBISHI ELECTRIC CORPORATION, Tokyo (JP); CENTRAL JAPAN RAILWAY COMPANY, Aichi-Ken (JP)

( * ) Notice: Subject to any disclaimer, the term of this patent is extended or adjusted under 35 U.S.C. 154(b) by 149 days.

(21) Appl. No.: 14/089,210

(22) Filed: Nov. 25, 2013

(65) Prior Publication Data
US 2014/0216578 A1    Aug. 7, 2014

(30) Foreign Application Priority Data

Feb. 6, 2013   (JP) .................................. 2013-021803

(51) Int. Cl.
*F02B 3/00*       (2006.01)
*F04B 41/02*      (2006.01)
(Continued)

(52) U.S. Cl.
CPC ............ *F04B 41/02* (2013.01); *B60T 13/665* (2013.01); *B60T 15/021* (2013.01); *B60T 15/048* (2013.01);
(Continued)

(58) Field of Classification Search
CPC ... B60T 15/045; B60T 15/021; B60T 17/228
USPC .............. 137/565.18, 565.13, 571; 303/7, 8, 303/9.66, 13, 40, 81, 82, 127, 128, 134
See application file for complete search history.

(56) References Cited

U.S. PATENT DOCUMENTS 1,923,141 A  *  8/1933  Farmer ........................ 303/40
1,936,827 A  *  11/1933  Campbell ...................... 303/66

(Continued)

FOREIGN PATENT DOCUMENTS

CN        2451436     10/2001
CN       200965631    10/2007

(Continued)

OTHER PUBLICATIONS

Extended European Search Report issued Nov. 25, 2014 in corresponding European Patent Application No. 13194169.2.

(Continued)

*Primary Examiner* — Jessica Cahill
*Assistant Examiner* — Angelisa L Hicks
(74) *Attorney, Agent, or Firm* — Wenderoth, Lind & Ponack, L.L.P.

(57) ABSTRACT

A compressed air supply apparatus includes a control unit configured to operate an air compressor when a measurement value of a pressure measurement unit reaches a first pressure or less, and configured to stop the air compressor when the measurement value reaches a second pressure higher than the first pressure, and a plurality of relief valve apparatuses installed in each of the connection flow path between the air compressor and each of a plurality of air tanks, wherein each of the plurality of relief valve apparatuses is configured to open the connection flow path to the atmosphere when the measurement value reaches a third pressure higher than the second pressure and close the connection flow path when the measurement value reaches a fourth pressure higher than the second pressure and lower than the third pressure after the opening.

9 Claims, 5 Drawing Sheets

(51) Int. Cl.
  *B60T 15/02* (2006.01)
  *B60T 17/02* (2006.01)
  *F04B 49/03* (2006.01)
  *B60T 13/66* (2006.01)
  *B60T 17/22* (2006.01)
  *B60T 15/04* (2006.01)

(52) U.S. Cl.
  CPC .............. *B60T 17/02* (2013.01); *B60T 17/228* (2013.01); *F04B 49/03* (2013.01); *Y10T 137/86051* (2015.04)

(56) References Cited

U.S. PATENT DOCUMENTS

| | | | | |
|---|---|---|---|---|
| 2,366,044 | A * | 12/1944 | McCune | 303/69 |
| 2,515,946 | A * | 7/1950 | Cadman | 303/7 |
| 3,796,467 | A * | 3/1974 | Kito | B60T 13/148 303/13 |
| 4,219,312 | A * | 8/1980 | Mori | F04C 28/24 417/295 |
| 4,696,626 | A | 9/1987 | Hata et al. | |
| 5,538,331 | A * | 7/1996 | Kettle, Jr. | 303/15 |
| 2005/0061373 | A1* | 3/2005 | McLaughlin et al. | 137/565.13 |
| 2006/0138856 | A1* | 6/2006 | McLaughlin et al. | 303/3 |
| 2007/0277900 | A1 | 12/2007 | Scherzinger et al. | |
| 2012/0286563 | A1* | 11/2012 | Lichterfeld et al. | 303/15 |

FOREIGN PATENT DOCUMENTS

| | | |
|---|---|---|
| EP | 0 469 615 | 2/1992 |
| GB | 831282 | 3/1960 |
| JP | 61-134585 | 8/1986 |
| JP | 1-10454 | 3/1989 |
| JP | 3-87988 | 9/1991 |
| JP | 6-24325 | 2/1994 |
| JP | 6-50264 | 2/1994 |
| JP | 11-201039 | 7/1999 |
| JP | 3150077 | 4/2009 |
| KR | 10-2000-0060646 | 10/2000 |

OTHER PUBLICATIONS

Korean Notice of Decision to Grant issued Sep. 23, 2014 in corresponding Korean Patent Application No. 10-2013-0137686 with English translation.

Office Action issued Nov. 17, 2015 in Chinese Application No. 201310698942.7 (with English translation of Search Report).

Decision to grant a European patent pursuant to Article 97(1) EPC issued Mar. 10, 2016 in European Patent Application No. 13194169.2.

Notice of Allowance dated Aug. 9, 2016 issued in corresponding Japanese Application No. 2013-021803 (with English translation).

* cited by examiner

COMPRESSED AIR SUPPLY APPARATUS

FIELD OF THE INVENTION

The present invention relates to a compressed air supply apparatus installed in a vehicle in which a plurality of cars are connected, such as a railroad vehicle or the like.

Priority is claimed from Japanese Patent Application No. 2013-021803, filed Feb. 6, 2013, the contents of which are incorporated herein by reference.

BACKGROUND ART

In a vehicle of a track-based transportation system which is referred to as an automated people mover (APM) or, in a railroad vehicle, since compressed air is used to manipulate a brake apparatus or open and close a door, an air compressor is provided (see Patent Document 1).

In a vehicle driven in a formation in which a plurality of cars are connected, a plurality of air compressors are installed in the formation. When pressure accumulation to an air tank installed in each vehicle is needed, all of the air compressors are simultaneously started, and simultaneously stopped when the pressure accumulation is terminated.

Here, a plurality of pressure regulators configured to observe a pressure in the air tank are generally installed in the formation. Meanwhile, the operation and stoppage of the air compressor is controlled by a pressure in the air tank observed by any one of the pressure regulators in the formation. For this reason, when the air compressor is stopped, unevenness occurs at the pressure in the respective air tanks. Accordingly, upon design of the vehicle, a pressure gradient, which is unevenness of the pressure between the air tanks, is previously estimated, and it is determined which cars in the formation for the air compressor to be installed and a balance between capacities of the air tanks of the respective vehicles is determined such that an allowance can be secured with respect to a pressure within which a safety apparatus installed to protect the entire air system including the air compressors is operated.

RELATED ART DOCUMENT

Patent Document

[Patent Document 1] Japanese Utility Model Registration No. 3150077

DISCLOSURE OF THE INVENTION

Problems to be Solved by the Invention

However, due to the increase in the number and size of underfloor instruments as a result of increases in performance of recent vehicles, performance and disposition of the air compressor and a capacity of the air tank cannot be easily set at an optimal balance according to the pressure gradient estimated as described above. Accordingly, in this case, the pressure gradient may be increased. In addition, in recent vehicles, redundancy is secured such that a normal operation is continued even when several air compressors in the formation have malfunctioned, and even in this case, an installing balance of the air compressors and the air tanks may be deteriorated and the pressure gradient may be increased.

When the pressure gradient is increased, upon stoppage of the air compressor, the pressure in the air tank, which is not observed by the pressure regulator, may exceed an upper limit value at which the safety apparatus is operated, and a normal service operation may be obstructed due to a sudden change in pressure or an exhaust sound caused by repeated operation of the safety apparatus.

The present invention provides a compressed air supply apparatus configured to enable a service operation of a vehicle in a state in which a pressure gradient between air tanks is reduced, regardless of an installing balance of air compressors and air tanks in a formation in which a plurality of cars are connected.

Means for Solving the Problems

A compressed air supply apparatus according to a first aspect of the present invention includes an air compressor installed in at least one of a plurality of vehicles connected to each other; a plurality of air tanks connected to the air compressor via a connection flow path and installed in each of the plurality of vehicles in communication with each other; a pressure measurement unit configured to measure an air pressure in one air tank connected to the air compressor via a shortest flow path among the plurality of air tanks; a control unit configured to operate the air compressor when a measurement value of the pressure measurement unit reaches a first pressure or less, and configured to stop the air compressor when the measurement value reaches a second pressure higher than the first pressure; and a plurality of relief valve apparatuses installed in each of the connection flow path between the air compressor and each of the plurality of air tanks, wherein the relief valve apparatus has a flow-restricting unit configured to restrict an air flow, and a valve main body installed nearer to the air tank than the flow-restricting unit, and configured to open the connection flow path to the atmosphere when the measurement value reaches a third pressure higher than the second pressure and close the connection flow path when the measurement value reaches a fourth pressure higher than the second pressure and lower than the third pressure after the opening.

In the above-mentioned compressed air supply apparatus, first, the pressure accumulation is performed such that the pressure in the air tank is increased more than the first pressure by the air compressor. Then, the air compressor is stopped by the control unit when the pressure in the air tank measured by the pressure measurement unit reaches the second pressure. Here, when the pressure in the air tank is further increased after the air compressor is stopped and exceeds the third pressure, by opening the connection flow path to the atmosphere by the relief valve apparatus, the pressure in the air tank can be released.

Accordingly, the pressure does not exceed the third pressure in any of the air tanks. For this reason, in the case in which the safety apparatus operated when the pressure in the respective air tanks reaches a higher pressure than the third pressure is installed, even when the pressure gradient occurs between the air tanks during a normal operation and the pressure in some of the air tanks is increased, the above-mentioned safety apparatus is not operated.

Further, in the relief valve apparatus, an air flow between the air compressor and the air tank is restricted by a flow-restricting unit. For this reason, even when the valve main body opens the connection flow path to the atmosphere, if a short time elapses after the opening, the pressure is decreased to approach atmospheric pressure only between the air tank and the flow-restricting unit. The pressure does not abruptly decrease between the flow-restricting unit and the air compressor, and the high-pressure state needed for the pressure accumulation can be maintained.

In addition, when the pressure in the air tank is stabilized after the connection flow path is opened to the atmosphere by the relief valve apparatus and is decreased to the fourth pressure higher than the second pressure and lower than the third pressure, the valve main body of the relief valve apparatus is closed. In this case, as described above, since the pressure between the flow-restricting unit and the air compressor does not decrease, the pressure accumulation inside the air tank can be rapidly performed when the valve main body is closed.

Further, in the compressed air supply apparatus according to a second aspect of the present invention, the flow-restricting unit according to the first aspect may be a throttling flow path having a smaller flow path area than the connection flow path.

As described above, as the throttling flow path is formed as the flow-restricting unit, even when the pressure gradient between the air tanks occurs during the normal operation, the above-mentioned safety apparatus is not operated, and further, the pressure accumulation can be rapidly performed after the valve main body of the relief valve apparatus is closed.

Further, in the compressed air supply apparatus according to a third aspect of the present invention, the relief valve apparatus according to the first aspect or the second aspect may be installed downstream from a flexible pipe installed in the connection flow path.

As described above, in general, the flexible pipe is installed between the air compressor and the air tank, and thus vibrations in the air compressor are not transmitted downstream. For this reason, as the relief valve apparatus is installed downstream from the flexible pipe, an influence of the vibrations can be reduced, and durability of the relief valve apparatus is improved.

In addition, in the compressed air supply apparatus according to a fourth aspect of the present invention, the relief valve apparatus according to any one of the first to third aspects may be installed downstream from an aftercooler installed in the connection flow path and configured to dehumidify the compressed air.

As described above, in general, the aftercooler is installed between the air compressor and the air tank, and the air increased to a high pressure and a high temperature by the air compressor is cooled. For this reason, as the relief valve apparatus is installed downstream from the aftercooler, an influence of heat can be reduced, and durability of the relief valve apparatus is improved.

Effects of the Invention

According to the above-mentioned compressed air supply apparatus, as the relief valve apparatus is installed between the air compressor and the air tank, the operation can be performed in a state in which the pressure gradient between the air tanks is reduced, regardless of an installing balance of the air compressors and the air tanks in the formation.

MODE FOR CARRYING OUT THE INVENTION

Hereinafter, a compressed air supply apparatus 1 according to an embodiment of the present invention will be described.

Figure 1:
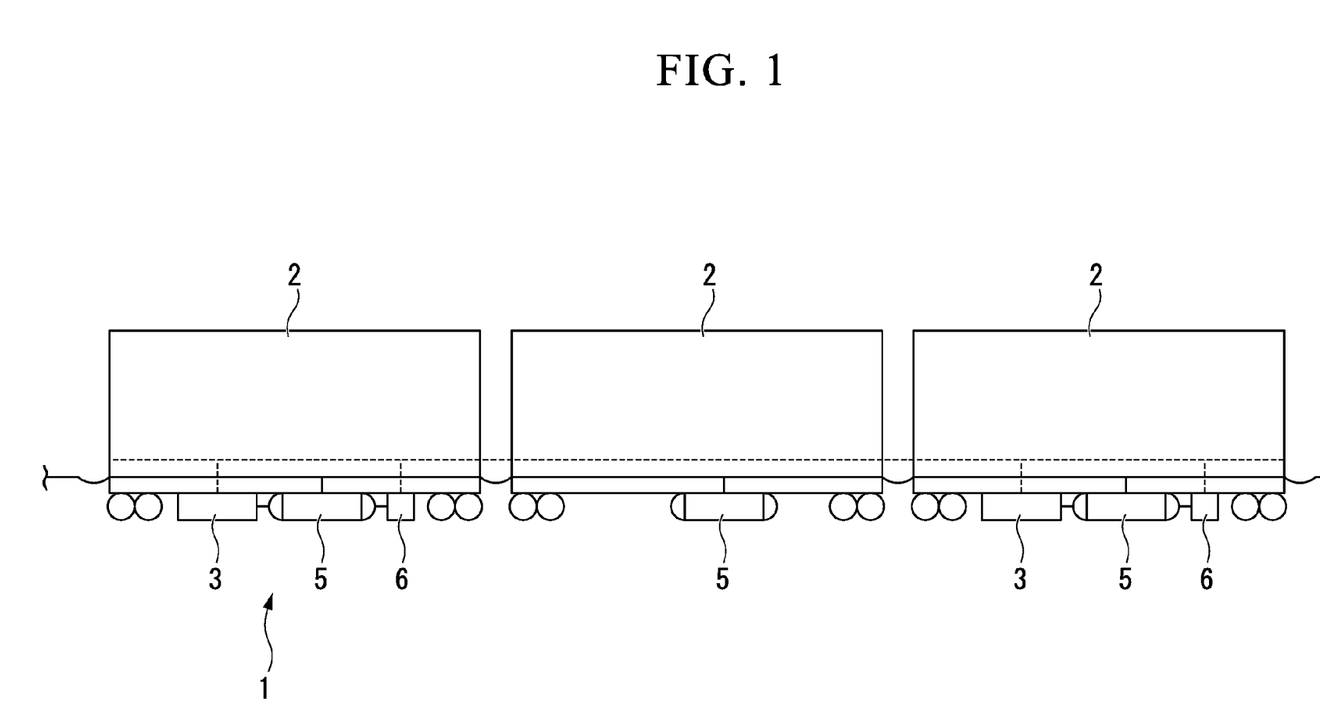
FIG. 1 is a schematic view showing a vehicle including a compressed air supply apparatus according to an embodiment of the present invention.

As shown in FIG. 1, the compressed air supply apparatus 1 is installed in railroad vehicles 2 (hereinafter, simply referred to as vehicles 2) connected to each other to generate compressed air A used to manipulate a brake, open and close a door, or the like.

Figure 2:
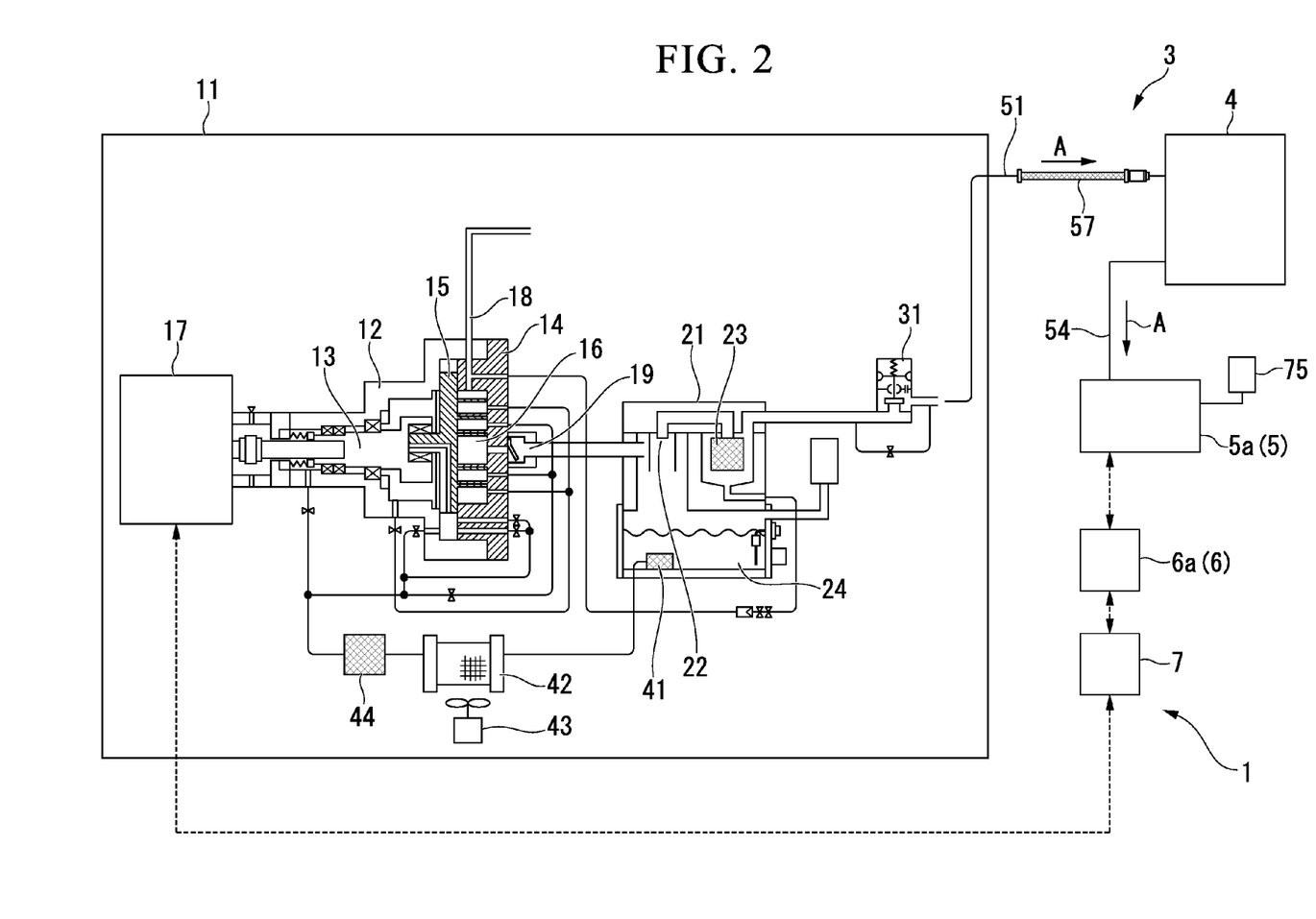
FIG. 2 is a view showing a configuration of an air compressor of the compressed air supply apparatus according to the embodiment of the present invention.

As shown in FIGS. 1 and 2, the compressed air supply apparatus 1 includes an air compressor 3 installed under a floor of the vehicle 2 and configured to take air thereinto to generate the compressed air A, a dehumidification apparatus 4 configured to perform dehumidification of the compressed air A from the air compressor 3, an air tank 5 configured to store the compressed air A passing through the dehumidification apparatus 4, a pressure regulator 6 configured to observe a pressure in the air tank 5, and a control unit 7 configured to control an operation of the air compressor 3 according to a measurement value of the pressure regulator 6.

Figure 3:
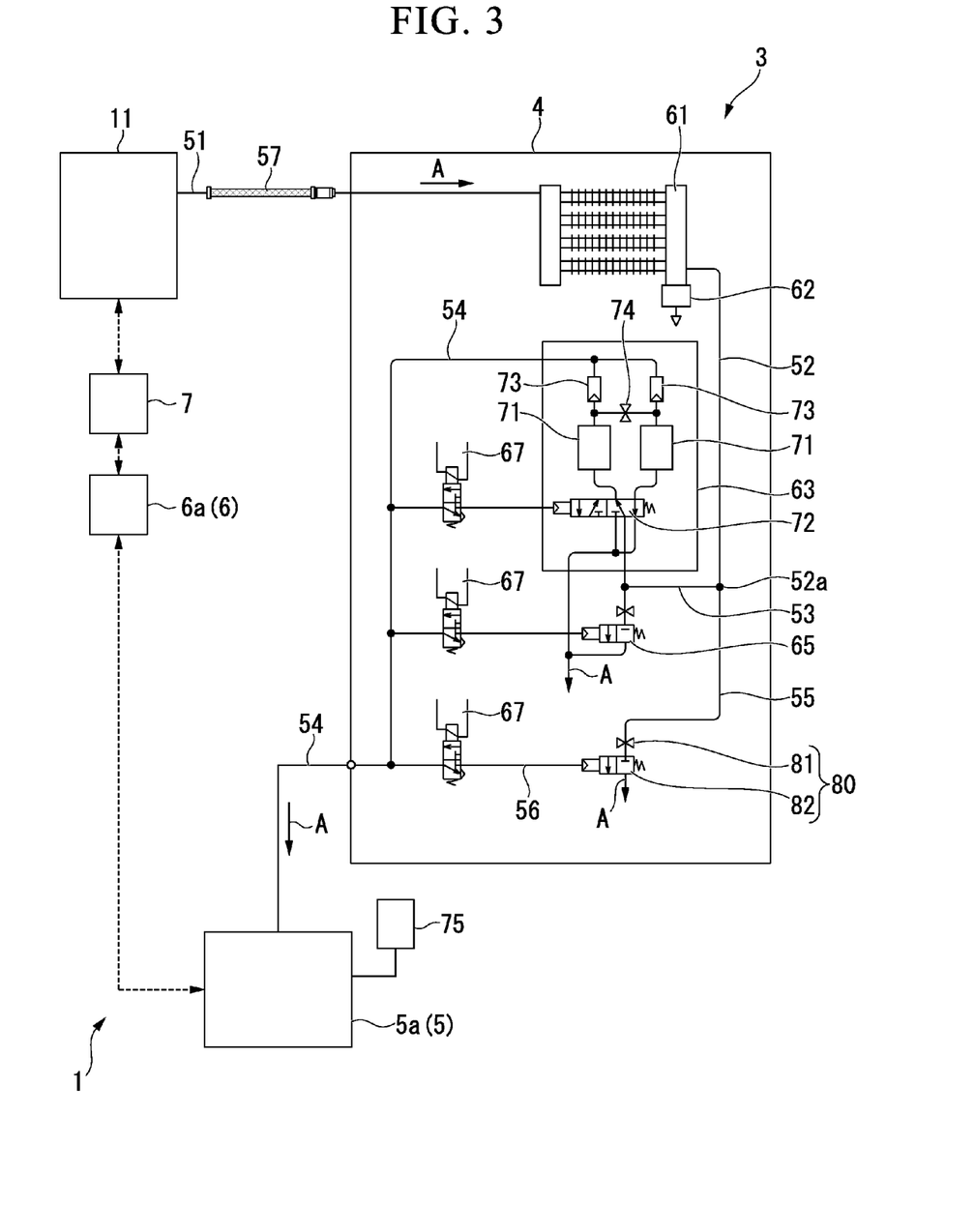
FIG. 3 is a view showing a configuration of a dehumidification apparatus of the compressed air supply apparatus according to the embodiment of the present invention.

Further, the compressed air supply apparatus 1 includes a relief valve apparatus 80, shown in FIG. 3, installed in the dehumidification apparatus 4 and configured to release the pressure in the air tank 5 to the atmosphere when the pressure in the air tank 5 is higher than a predetermined value.

Here, the vehicles 2 of the embodiment, in which 10 cars are connected, constitute one formation, and Table 1 indicates whether or not the air compressor 3, the pressure regulator 6, and the air tank 5 are included in each of the cars, as well as a tank capacity (L) of the air tank 5 of each of the cars.

In addition, the number of cars in the formation of the vehicles 2, the car number on which each instrument is installed, and a capacity of the air tank 5 indicated in Table 1 are conditions exemplarily described in the embodiment and are not limiting.

TABLE 1

| | Car No. | | | | | | | | | |
|---|---|---|---|---|---|---|---|---|---|---|
| | 1 | 2 | 3 | 4 | 5 | 6 | 7 | 8 | 9 | 10 |
| Air compressor 3 | ○ | | | ○ | ○ | | | | | |
| Pressure regulator 6, Safety valve 75 | ○ | | | ○ | ○ | | | | ○ | ○ |
| Air tank 5 (Capacity) | 400 (L) | 520 (L) | 520 (L) | 400 (L) | 400 (L) | 400 (L) | 300 (L) | 520 (L) | 300 (L) | 700 (L) |

As shown in Table 1, the air compressors 3 are installed in the cars numbers 1, 4 and 5, and each of the air compressors 3 has a compressor main body 11 configured to compress air introduced from the outside, and an oil separator 21 configured to separate an oil from the compressed air A from the compressor main body 11.

The compressor main body 11 has a main body case 12, a driving shaft 13 and a fixed vortex body 14, which are installed in the main body case 12, a rotating vortex body 15 attached to the driving shaft 13 in the main body case 12 and configured to form a vortex compression chamber 16 with the fixed vortex body 14, and an electric motor 17 configured to rotate the driving shaft 13, which constitute a so-called vortex type air compressor.

The compressor main body 11 is provided with a suction port 18 in communication with the vortex compression chamber 16 and configured to suction the compressed air A, and an ejection port 19 in communication with the vortex compression chamber 16 and configured to eject the compressed air A.

The oil separator 21 has a cyclone section 22 connected to the ejection port 19 of the compressor main body 11 and configured to separate a lubricating oil included in the compressed air A introduced from the compressor main body 11, a filter section 23 configured to further separate the lubricating oil after that, and a sump section 24 configured to collect the lubricating oil separated by the filter section 23.

The sump section 24 is in communication with a bearing section (not shown) in the compressor main body 11. The sump section 24 conveys a lubricating oil to the bearing section via an oil pre-filter 41, an oil cooler 42 (including a rotary fan 43), and an oil filter 44.

A pressure-limiting valve 31 configured to secure a pressure of the sump section 24 is installed downstream from the oil separator 21. The dehumidification apparatus 4 is connected to the pressure-limiting valve 31.

As shown in FIG. 3, the dehumidification apparatus 4 is connected to the pressure-limiting valve 31 of the air compressor 3 via a first connecting pipe (a connection flow path) 51.

Here, a flexible pipe 57 such as a hose or the like formed of Teflon (registered trademark) is installed in the first connecting pipe 51 such that vibration from the air compressor 3 is not transmitted to the dehumidification apparatus 4.

The dehumidification apparatus 4 has an aftercooler 61 configured to cool the compressed air A from the air compressor 3, and an adsorption apparatus 63 and an unloading valve 65 installed between the aftercooler 61 and the air tank 5.

A drain valve 62 is installed in the aftercooler 61, and moisture contained in the compressed air A generated by cooling the compressed air A is discharged from the drain valve 62. Here, humidity in the compressed air A becomes substantially 100% and the compressed air A is conveyed downward.

The adsorption apparatus 63 is connected to the aftercooler 61 via a second connecting pipe (a connection flow path) 52, and a third connecting pipe (a connection flow path) 53 connected to one end 52a of the second connecting pipe 52. Then, starting from an upstream end, the adsorption apparatus 63 includes a switching valve 72, two adsorption sections 71 connected in parallel to the switching valve 72, check valves 73 connected to the adsorption sections 71, respectively, and a regeneration throttling section 74 installed between the adsorption sections 71 and the check valves 73 to bring the two adsorption sections 71 in communication with each other.

In the adsorption apparatus 63, while dehumidification of the compressed air A is performed by absorbing the moisture contained in the compressed air A in one of the adsorption sections 71, some of the compressed air A passes through the regeneration throttling section 74 to enter the other of the adsorption sections 71 after passing through the one of the adsorption sections 71, and dries the other of the adsorption sections 71. Accordingly, dehumidification of the compressed air A can be continuously performed.

A fourth connecting pipe (a connection flow path) 54 is connected to the two check valves 73 of the adsorption apparatus 63, and the air tank 5 and the dehumidification apparatus 4 are connected via the fourth connecting pipe 54.

The unloading valve 65 is a valve apparatus installed in parallel at the adsorption apparatus 63 to be branched off from the third connecting pipe 53 and configured to open the third connecting pipe 53 to the atmosphere to eject the compressed air A to the outside. That is, as the third connecting pipe 53 is opened to the atmosphere, the unloading valve 65 is used to reduce a load of an electric motor the next time it is started by bringing the entire inside of the compressed air supply apparatus 1 in communication with the atmosphere.

In the dehumidification apparatus 4, the switching valve 72 is in communication with the fourth connecting pipe 54 via an electromagnetic valves 67, and the unloading valve 65 is in communication with the fourth connecting pipe 54 via an electromagnetic valves 67.

The air tank 5 stores the compressed air A via the dehumidification apparatus 4 from the air compressor 3 to perform the pressure accumulation. In addition, in the embodiment, as represented in Table 1, the air tanks 5 are installed in the respective cars, and have different capacities at the respective cars.

Here, in the embodiment, the air tank 5a installed in the $10^{th}$ car is connected to the air compressor 3 via the shortest first connecting pipe 51, and response of the pressure accumulation in the air tank 5a of the $10^{th}$ car is fastest.

Here, as represented in Table 1, in the $1^{st}$, $4^{th}$, $5^{th}$, $9^{th}$ and $10^{th}$ cars, the safety valves 75 and the pressure regulators 6 are installed.

The pressure regulator 6 measures and observes the pressure in the air tank 5. Here, the pressure regulator 6 configured to observe the pressure of the air tank 5 of the $10^{th}$ car is referred to as a pressure measurement apparatus (a pressure measurement unit) 6a.

The safety valve 75 is installed in each of the pressure regulators 6 to release the compressed air when the pressure approaches an adjustment pressure to protect the connected instruments, in the case in which the air system malfunctions and the pressure increases.

Specifically, in the embodiment, it is determined as a malfunction when the pressure in the air tank 5 is 950 kPa, and the safety valve 75 releases the compressed air into the atmosphere.

The control unit 7 operates the air compressor 3 when the pressure in the air tank 5a measured by the pressure measurement apparatus 6a is 800 kPa (a first pressure) or less, and stops the air compressor 3 when the pressure exceeds 900 kPa (a second pressure).

Next, the relief valve apparatus 80 will be described.

The relief valve apparatus 80 is connected to the one end 52a of the second connecting pipe 52 via a fifth connecting pipe (a connection flow path) 55 to be bifurcated at the third connecting pipe 53. The relief valve apparatus 80 and the fourth connecting pipe 54 are connected by a sixth connecting pipe (a connection flow path) 56 having an electromagnetic valve 67 and come in communication with the air tank 5.

The relief valve apparatus 80 has a fixed throttling section (a flow-restricting unit, a throttling flow path) 81 installed at a halfway position of the fifth connecting pipe 55, and the valve main body 82 installed at a downstream side from the fixed throttling section 81 nearer to the air tank 5.

The fixed throttling section 81 is a throttling flow path having a smaller diameter than a pipe diameter of the fifth connecting pipe 55, and restricts a flow of the compressed air A.

The fixed throttling section 81 may not be the throttling flow path, but, for example, may be a throttling valve or the like, or may be integrally formed with the valve main body 82. That is, any throttling section may be used as long as the flow of the compressed air A at the fifth connecting pipe 55 can be restricted.

The valve main body 82 opens the sixth connecting pipe 56 to the atmosphere and ejects the compressed air A to the outside when the pressure in the air tank 5a of the $10^{th}$ car measured by the pressure measurement apparatus 6a reaches 930 kPa (a third pressure), which is higher than 900 kPa, which is the pressure at which the air compressor 3 is stopped. In addition, when the pressure in the air tank 5a is stable and measured by the pressure measurement apparatus 6a as 920 kPa (a fourth pressure), which is lower than 930 kPa and higher than 900 kPa, the valve main body 82 is rapidly closed.

Here, in the embodiment, the valve main body 82 has the same configuration as the above-mentioned unloading valve 65 of the dehumidification apparatus 4.

In the above-mentioned compressed air supply apparatus 1, first, the air compressor 3 is operated, and the pressure accumulation is performed such that the pressure in the air tank 5a is higher than 800 kPa. After that, the operation of the air compressor 3 is stopped by the control unit 7 when the pressure in the air tank 5a measured by the pressure measurement apparatus 6a reaches 900 kPa.

Figure 4:
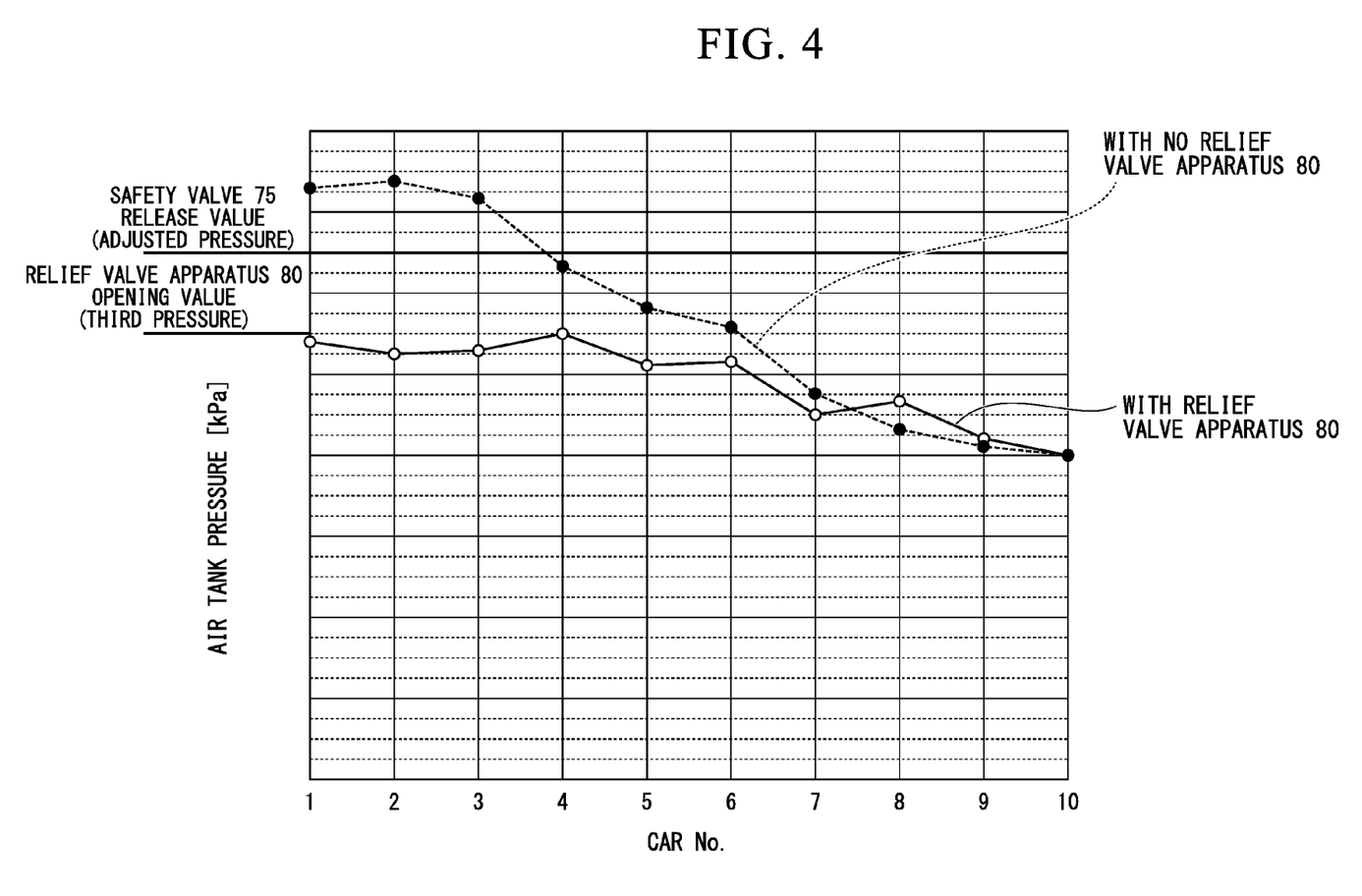
FIG. 4 is a graph showing pressures in the air tanks in the respective cars of the compressed air supply apparatus according to the embodiment of the present invention, showing a difference in pressure gradient according to presence of a relief valve apparatus.

Here, even when the pressure in the air tank 5a of the $10^{th}$ car reaches 900 kPa and the air compressor 3 is stopped, as shown in FIG. 4, a pressure gradient may occur between the air tanks 5 by an imbalance in installation of the air compressors 3 and the air tanks 5 in the formation.

Then, when the pressure gradient is increased and the pressure in some of the air tanks 5 exceeds 950 kPa (see broken lines of FIG. 4), the safety valve 75 may release the compressed air and it is determined as an abnormal state.

In this point, in the embodiment, when the pressure in the air tank 5 reaches 930 kPa, as release into the atmosphere is performed by the relief valve apparatus 80, the pressure in the air tank 5 is relieved. Accordingly, the pressure does not exceed 930 kPa in any of the air tanks 5, and the safety valve 75 is not operated during the conventional operation (see solid lines of FIG. 4).

Further, in the relief valve apparatus 80, a flow of the compressed air A between the air compressor 3 and the air tank 5 is restricted by the fixed throttling section 81. For this reason, even when the valve main body 82 of the relief valve apparatus 80 opens the sixth connecting pipe 56 to the atmosphere, the pressure is decreased only between the air tank 5 and the fixed throttling section 81. Meanwhile, the pressure does not abruptly decrease between the fixed throttling section 81 and the air compressor 3.

Accordingly, a high-pressure state needed for the pressure accumulation can be maintained between the fixed throttling section 81 and the air compressor 3, and when the pressure in the air tank 5 is decreased to 920 kPa (a fourth pressure) after the sixth connecting pipe 56 is opened to the atmosphere by the valve main body 82, the pressure accumulation inside the air tank 5 can be rapidly performed by closing the sixth connecting pipe 56 by the valve main body 82 again.

Figure 5:
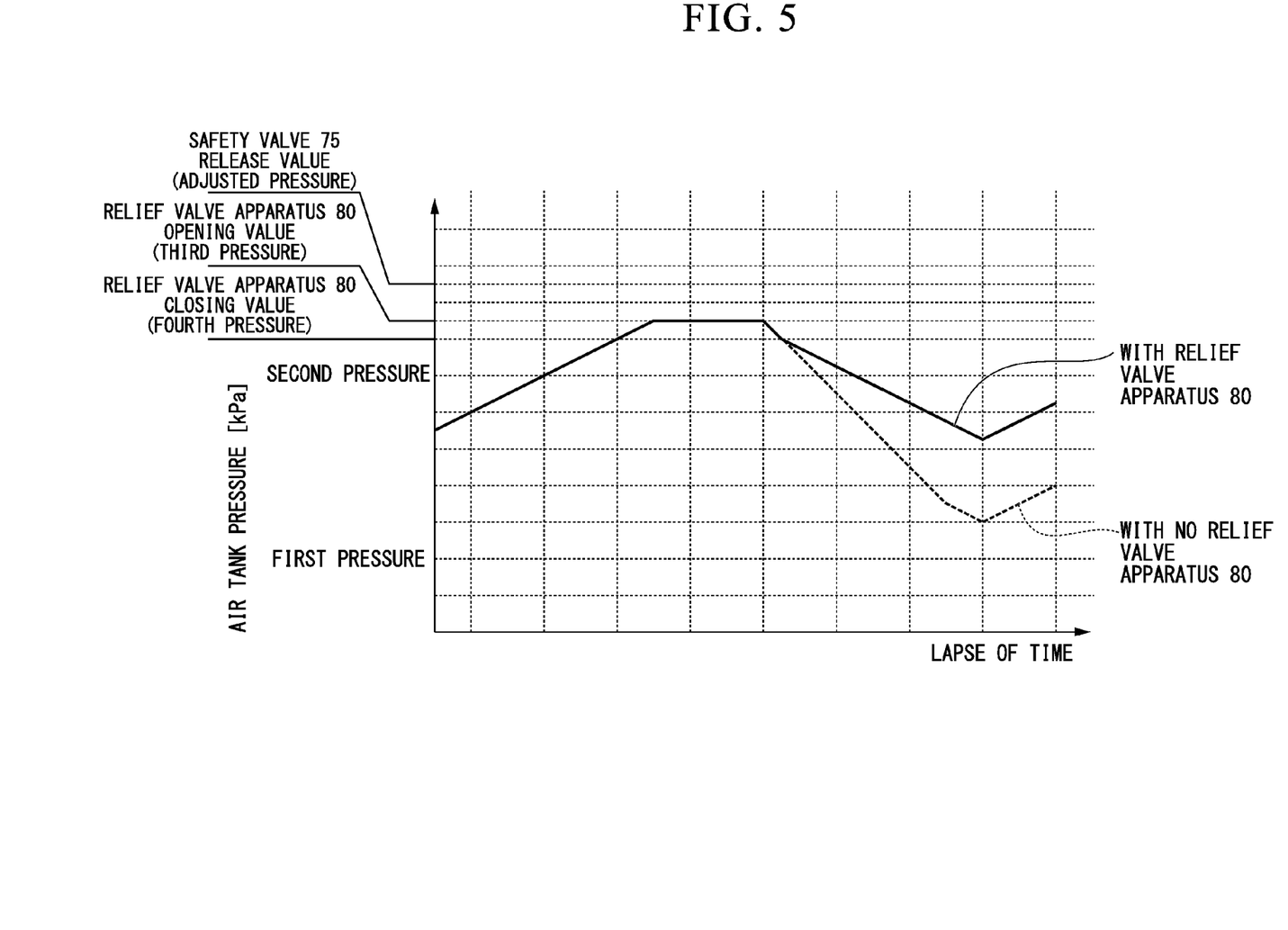
FIG. 5 is a graph showing a difference in pressure accumulation rate according to presence of the relief valve apparatus of the compressed air supply apparatus according to the embodiment of the present invention.

Specifically, as shown in broken lines of FIG. 5, if the fixed throttling section 81 is not formed, when the sixth connecting pipe 56 is opened to the atmosphere by the valve main body 82 of the relief valve apparatus 80, since the pressure in the air tank 5 is abruptly decreased, time is needed before the pressure accumulation is performed again. Meanwhile, as shown in solid lines of FIG. 5, the time before the pressure accumulation is performed again can be reduced by forming the fixed throttling section 81.

Further, since the relief valve apparatus 80 is installed in the dehumidification apparatus 4, the apparatus is installed downstream from the flexible pipe 57. For this reason, an influence of the vibration of the air compressor 3 can be reduced, and durability of the relief valve apparatus 80 is improved.

In addition, the relief valve apparatus 80 is installed in the dehumidification apparatus 4 downstream from the aftercooler 61. For this reason, an influence of heat of the compressed air A at a high temperature and a high pressure by the air compressor 3 can be reduced, and durability of the relief valve apparatus 80 is improved.

Further, since the valve main body 82 in the relief valve apparatus 80 can be used like the unloading valve 65, reduction of a cost due to communization of parts is possible.

According to the compressed air supply apparatus 1 of the embodiment, as the relief valve apparatus 80 is installed between the air compressor 3 and the air tank 5, the safety valve 75 does not release the compressed air during a normal operation, and the operation can be performed in a state in which the pressure gradient between the air tanks 5 is reduced, regardless of an installing balance of the air compressors 3 and the air tanks 5 in the formation.

While the exemplary embodiment of the present invention has been described, the present invention is not limited to the above-mentioned embodiment. Addition, omission, substitution and other modifications of components may be made without departing from the spirit of the present invention. The present invention is not limited by the above-mentioned description but limited only by the scope of the accompanying claims.

For example, when a throttling valve configured to adjust an aperture is used instead of the fixed throttling section 81 of the relief valve apparatus 80, a degree of throttling can be adjusted. For this reason, according to the above-mentioned adjustment, since a response speed can be appropriately adjusted when the pressure accumulation is performed again after the valve main body 82 is opened, convenience can be improved.

In addition, as shown in FIG. 3, the fixed throttling section 81 need not to be necessarily installed near the valve main body 82, and may be installed at least at an upstream side from the valve main body 82 nearer to the air compressor 3 and downstream from the one end 52a of the second connecting pipe 52.

Further, when the unloading valve 65 is not installed in the dehumidification apparatus 4, the relief valve apparatus 80 may be installed upstream from the flexible pipe 57 or the aftercooler 61, but the relief valve apparatus 80 is preferably installed downstream from the flexible pipe 57 and the aftercooler 61.

Furthermore, in the embodiment, the case in which the compressed air supply apparatus 1 is installed in the railroad vehicle 2 has been described. However, the compressed air supply apparatus 1 is not limited to be installed in the railroad vehicle 2, for example, may be installed in a vehicle of a track-based transportation system using a plurality of cars being connected.

In addition, numerical values of the pressure referred to as 800 kPa, 900 kPa, 920 kPa, 930 kPa and 950 kPa are exemplary values and are not limited thereto.

INDUSTRIAL APPLICABILITY

The present invention relates to the compressed air supply apparatus installed in the vehicle in which the plurality of, for example, railroad vehicles are connected. According to the compressed air supply apparatus of the embodiment of the present invention, as the relief valve apparatus is installed between the air compressor and the air tank, the operation can be performed in a state in which the pressure gradient between the air tanks is reduced, regardless of an installing balance of the air compressors and the air tanks in the formation.

DESCRIPTION OF REFERENCE NUMERALS 1 compressed air supply apparatus
2 (railroad) vehicle
3 air compressor
4 dehumidification apparatus
5 air tank
6 pressure regulator
6a pressure measurement apparatus (pressure measurement unit)
7 control unit
11 compressor main body
12 main body case
13 driving shaft
14 fixed vortex body
15 rotating vortex body
16 vortex compression chamber
17 electric motor
18 suction port
19 ejection port
21 oil separator
22 cyclone section
23 filter section
24 sump section
31 pressure-limiting valve
41 oil pre-filter
42 oil cooler
43 rotary fan
44 oil filter
51 first connecting pipe (connection flow path)
52 second connecting pipe (connection flow path)
52a one end
53 third connecting pipe (connection flow path)
54 fourth connecting pipe (connection flow path)
55 fifth connecting pipe (connection flow path)
56 sixth connecting pipe (connection flow path)
57 flexible pipe
61 aftercooler
62 drain valve
63 adsorption apparatus
65 unloading valve
67 electromagnetic valve
71 adsorption section
72 switching valve
73 check valve
74 regeneration throttling section
75 safety valve
80 relief valve apparatus
81 fixed throttling section (flow-restricting unit)
82 valve main body
A compressed air

The invention claimed is:

1. A compressed air supply apparatus comprising:
an air compressor installed in at least one of a plurality of vehicles connected to each other;
a plurality of air tanks connected to the air compressor via a connection flow path and installed in each of the plurality of vehicles in communication with each other;
a pressure measurement unit configured to measure an air pressure in one of the plurality of air tanks connected to the air compressor via a shortest flow path, among the plurality of air tanks;
a control unit configured to operate the air compressor when a measurement value of the pressure measurement unit reaches a first pressure or less, and configured to stop the air compressor when the measurement value reaches a second pressure higher than the first pressure;
a plurality of relief valve apparatuses installed in each of the connection flow path between the air compressor and each of the plurality of air tanks, and
a safety valve configured to release compressed air in the plurality of air tanks into an atmosphere when an air pressure in the plurality of air tanks reaches a pressure higher than the second pressure,
wherein each of the plurality of relief valve apparatuses comprises:
a flow-restricting unit configured to restrict an air flow, and
a valve main body installed nearer to a corresponding one of the plurality of air tanks than the flow-restricting unit, configured to open the connection flow path to the atmosphere when the measurement value reaches a third pressure higher than the second pressure and lower than the pressure at which the safety valve is operated, and configured to close the connection flow path when the measurement value reaches a fourth pressure higher than the second pressure and lower than the third pressure after the opening.

2. The compressed air supply apparatus according to claim 1, wherein the flow-restricting unit is a throttling flow path having a smaller flow path area than the connection flow path.

3. The compressed air supply apparatus according to claim 2, wherein each of the plurality of relief valve apparatuses is installed downstream from a flexible pipe installed in the connection flow path.

4. The compressed air supply apparatus according to claim 3, wherein each of the plurality of relief valve apparatuses is installed downstream from an aftercooler installed in the connection flow path and configured to dehumidify compressed air.

5. The compressed air supply apparatus according to claim 2, wherein each of the plurality of relief valve apparatuses is installed downstream from an aftercooler installed in the connection flow path and configured to dehumidify compressed air.

6. The compressed air supply apparatus according to claim 1, wherein each of the plurality of relief valve apparatuses is installed downstream from a flexible pipe installed in the connection flow path.

7. The compressed air supply apparatus according to claim 6, wherein each of the plurality of relief valve apparatuses is installed downstream from an aftercooler installed in the connection flow path and configured to dehumidify compressed air.

8. The compressed air supply apparatus according to claim 1, wherein each of the plurality of relief valve apparatuses is installed downstream from an aftercooler installed in the connection flow path and configured to dehumidify compressed air.

9. The compressed air supply apparatus according to claim 8, wherein the aftercooler is installed in the connection flow path separately from the air compressor.

* * * * *